United States Patent [19]
Vinson

[11] Patent Number: 6,115,548
[45] Date of Patent: Sep. 5, 2000

[54] METHOD AND APPARATUS FOR INTERFACING DATA SIGNAL AND ASSOCIATED CLOCK SIGNAL TO CIRCUIT CONTROLLED BY LOCAL CLOCK SIGNAL

[75] Inventor: Peter J. Vinson, Olney, United Kingdom

[73] Assignee: Texas Instruments Incorporated, Dallas, Tex.

[21] Appl. No.: 08/820,429

[22] Filed: Mar. 12, 1997

Related U.S. Application Data

[63] Continuation of application No. 08/531,682, Sep. 21, 1995, abandoned, which is a continuation of application No. 08/062,640, May 13, 1993, abandoned.

[30] Foreign Application Priority Data

May 15, 1992 [GB] United Kingdom .................... 9210414

[51] Int. Cl.⁷ ...................................... G06F 5/06
[52] U.S. Cl. .............................................. 395/558
[58] Field of Search .................... 395/555, 556, 395/558, 559, 371, 373

[56] References Cited

U.S. PATENT DOCUMENTS

| | | | |
|---|---|---|---|
| 3,980,993 | 9/1976 | Bredart et al. | 340/172.5 |
| 4,390,985 | 6/1983 | Fourcade et al. | 370/94 |
| 4,673,979 | 6/1987 | Kabo et al. | 358/142 |
| 4,949,361 | 8/1990 | Jackson | 375/118 |
| 4,970,679 | 11/1990 | Tachibana | 364/900 |
| 5,040,109 | 8/1991 | Bowhill et al. | 364/200 |

FOREIGN PATENT DOCUMENTS

| | | |
|---|---|---|
| 0 021 942 | 6/1980 | France . |
| 0 037 299 | 3/1981 | France . |
| 9222171 | 10/1992 | United Kingdom ........... H04N 7/087 |
| WO-A-92 22171 | 12/1992 | WIPO . |

OTHER PUBLICATIONS

Jafford, 'Two IC's for Teletext Data Demodulation', IEEE Transactions On Consumer Electronics, vol. CE–31, No. 3, Aug. 1985, pp. 278–282.

IEEE Transactions on Consumer Electronics, vol. CE–31, No. 3, Aug. 1985, New York, USA, Two IC's for Teletext Data Demodulation, pp. 278–282, J. L. Jaffard.

*Primary Examiner*—Kevin A. Kriess
*Attorney, Agent, or Firm*—Richard L. Donaldson; William B. Kempler

[57] ABSTRACT

A method and apparatus for interfacing a serial data signal having an associated data clock signal to a circuit, which is clocked at a slightly higher local clock frequency, employs a D-type flip-flop to sample the data clock signal at the local clock frequency. Another D-type flip-flop stores the sample previous to that stored by the first flip-flop and on the basis of these two stored samples a decision is made as to which clock pulses of the local clock should be passed by a gate to form a modified clock signal. This modified clock signal is used to clock a third flip-flop which reads in the bits of the data signal. The modified clock signal can then be used to clock the data through a shift register so that it can be converted to a parallel format.

16 Claims, 5 Drawing Sheets

METHOD AND APPARATUS FOR INTERFACING DATA SIGNAL AND ASSOCIATED CLOCK SIGNAL TO CIRCUIT CONTROLLED BY LOCAL CLOCK SIGNAL

This application is a Continuation, of application Ser. No. 08/531,682, now abandoned filed Sep. 21, 1995; which was a continuation of parent application Ser. No. 08/062,640, now abandoned filed May 13, 1993.

The present invention relates to interfacing a data signal and an associated external clock signal to a circuit.

One approach to the problem of feeding a data signal and its associated external clock signal to a circuit is to use the external clock signal to determine when to read in each bit of the data signal, and, if the circuit processes the data signal further using clocked logic, also to use that external clock to drive that clocked logic. However in certain applications it is necessary to clock at a high rate some parts of the circuit that take values from the data signal as inputs. In that situation one solution would be to enter the data into a buffer under the control of the external clock and read it out from the buffer under the control of a local system clock controlling the rest of the circuit.

There are some disadvantages to that approach. The circuit required is relatively complex, the buffer needs to be capable of being operated by two different clocks while the rest of the circuit remains connected always to only one or other of the clocks. Also having two clocks makes the usual method of testing a circuit by clocking through test patterns difficult to apply.

It is an object of the present invention to provide a method of interfacing a data signal and an associated clock signal to a circuit controlled by a local clock without the need for both clocks to be able to control some elements of the circuit.

According to one aspect of the present invention there is provided a method of reading a data signal, the data signal having an associated data clock signal with a frequency equal to the bit rate of the data signal, including providing a local clock signal having a higher frequency than the data clock signal, sampling the data clock signal at time instants referenced to the local clock signal, determining from the data clock samples particular time instants referenced to the local clock signal, and reading the data signal at the particular time instants, so that each bit of the data signal is read once and only once during that portion of the bit period that the value of the bit is stable.

In one example of the method the particular time instants determined from the data clock samples are whole numbers of periods of the local clock signal after the time instants when the data clock signal was sampled, the number of periods depending on the value of the sample of the data clock signal obtained. The data clock signal may consist of marks and spaces of substantially equal duration and the number of periods may be one if the sampled value of the data clock signal is a mark and two if the sampled value of the data clock signal is a space.

According to a second aspect of the present invention there is provided apparatus for reading a data signal having an associated data clock signal with a frequency equal to the bit rate of the data signal, including clock means for producing a local clock signal having a higher frequency than the data clock signal, first and second latches clocked by the local clock signal, the first latch being connected to receive the data clock signal as a digit input and producing an output bit applied as a digit input to the second latch, gating means responsive to the output bits of the latches and the local clock signal to produce as output selected parts of the local clock signal having an average frequency equal to the bit rate of the data signal, and means responsive to the output of the gating means to sample each bit of the data signal while it has a stable value.

The general approach of the present invention is not to provide complex buffers which can be controlled by both the local clock and the data clock but rather to sample the data clock to ascertain sufficient information as to the location of the bits within the data signal and then to read the data signal, both the sampling of the data clock signal and the reading of the data signal being under the control of the local clock.

This of course can be achieved by sampling the data clock signal many times during each of its periods and comparing these samples with each other to ascertain the location of features of the clock signal such as positive and negative going edges and hence the location of the bits within the data signal.

However the provision of such a high speed sampling process may be inappropriate or unnecessary. For example if the sampling process is carried out by part of a circuit that also processes further in some simple way the data contained in the data signal then a clock rate that is not so high may be all that is required. Another example would be where the further processing circuit is part of some larger system which operates at some standard frequency.

The present invention is designed to deal with such circumstances where it is desirable to interface a data signal and an associated data clock signal to a circuit operating at a slightly faster clock rate, although it can be used where other circumstances obtain.

The invention will now be described with reference to the accompanying figures of which:

Figure 1:
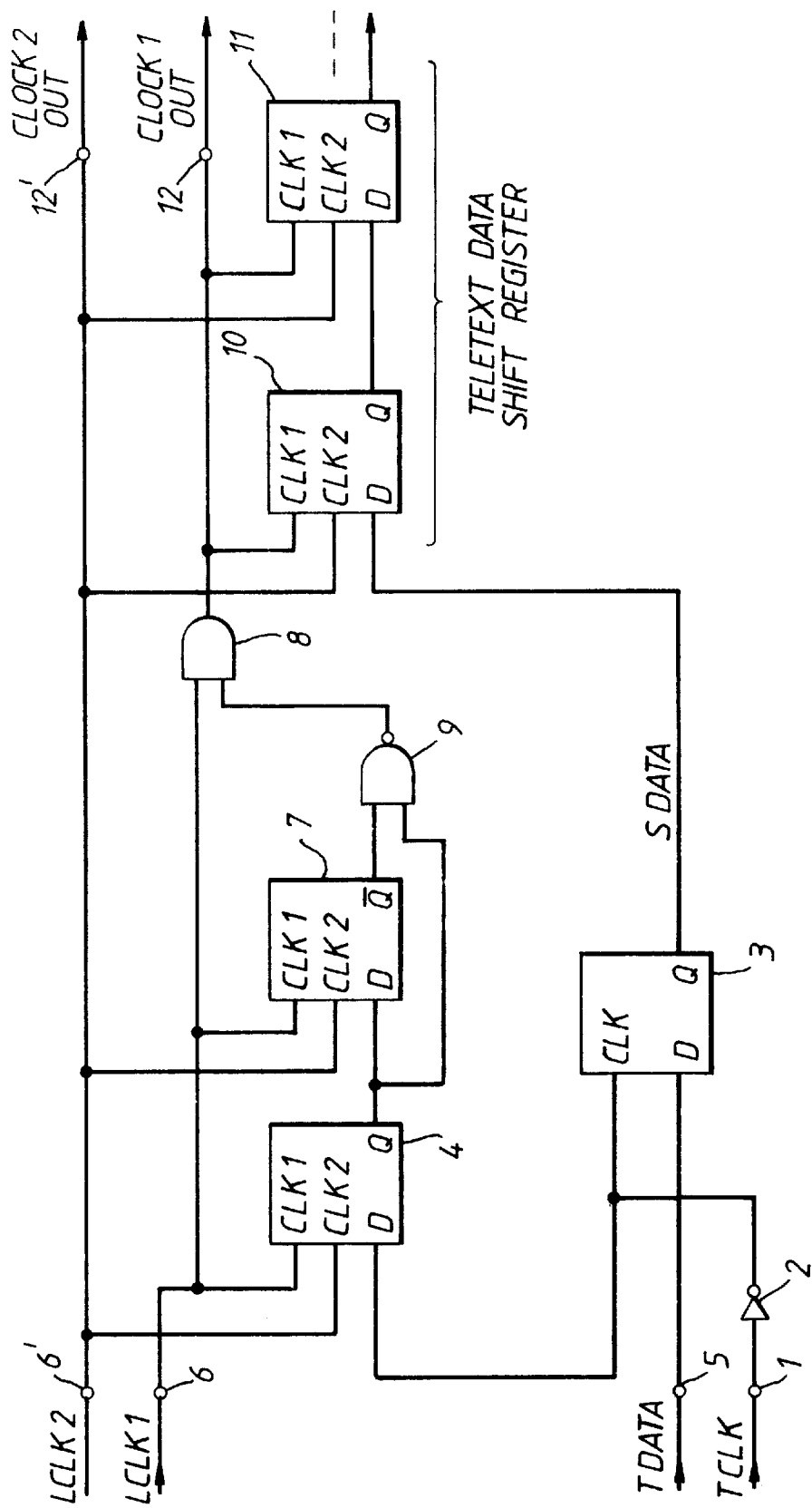
FIG. 1 shows an example of a circuit for reading a data signal using a locally generated clock signal.

Referring now to FIG. 1, a clock signal TCLK derived from a received teletext signal is applied via an input terminal 1 and through an inverter 2 to the clock input of a D-type flip-flop 3 and to the digit input of a D-type flip-flop 4. A data signal TDATA derived from the received teletext signal is applied via a second input terminal 5 to the digit input of the flip-flop 3.

Locally generated two-phase clock signals LCLK1 and LCLK2 are applied via input terminals 6 and 6' to respective clock inputs of the flip-flop 4 and of another D-type flip-flop 7. The flip-flops 4 and 7 are of the master-slave type having two separate clock inputs. The clock signal LCLK1 is also connected to an input of a 2-input AND gate 8. The Q output of the flip-flop 4 is connected to the digit input of the flip-flop 7 and also to an input of a 2-input NAND gate 9. The second input of the NAND gate 9 is connected to receive the $\overline{Q}$ output of the flip-flop 7. The output of the NAND gate 9 is connected to the second input of the AND gate 8.

The output of the AND gate 8 is a modified LCLK1 clock signal and together with the unmodified LCLK2 clock signal is applied to the respective clock inputs of two D-type flip-flops 10 and 11, also of the master-slave type, forming the first two stages of a shift register used to convert the teletext data from serial to parallel format. The modified LCLK1 clock signal and the clock signal LCLK2 are also applied to the clock inputs of the remaining stages of that shift register formed by flip-flops of the same type as 10 and 11 (not shown) and via terminals 12 and 12' to other parts of the system (also not shown) such as bit and character counters controlling the forwarding of the received data. The Q output of the flip-flop 3 at which stable data SDATA appears is connected to the digit input of the flip-flop 10. The Q output of the flip-flop 10 is connected to the digit input of the flip-flop 11, similar connections being made between the flip-flops forming the other stages of the shift register.

The flip-flops 4 and 7 sample the signals applied to their digit inputs at the negative going edges of the local clock signal LCLK1, the flip flops of the shift register 10, 11 sample the signals applied to their digit inputs at the negative going edges of the modified clock signal and the flip flop 3 samples the signal applied to its digit input et the negative going edges of TCLK which are, of course, the same times as the positive going edges of the inverted TCLK signal applied to the clock input of flip flop 4.

The data of a teletext, signal is in binary form using non-return-to-zero (NRZ) coding at a bit rate of 6.9375 MHz. The teletext data is separated from the television signal on which it was carried, and a clock signal is derived from the data and is used to stabilise the timing of the data using the flip-flop 3. The stabilised data bits appear sequentially at the Q output of the flip-flop 3.

Within the data processing circuitry to which the circuit shown in FIG. 1 is the input interface, a locally generated clock is used having a frequency of either 11.0 MHz or 11.5625 MHz depending on whether a voltage controlled oscillator or a frequency multiplier is used to generate signals for the display of the teletext data.

A purpose of the circuit shown in FIG. 1 is to receive the teletext data at its bit rate of 6.9375 MHz and to enable it to be processed by circuitry working under the control of a clock running at 11.0 MHz or 11.5625 MHz. In the operation of the circuit the AND gate 8 is opened to allow selected ones of the pulses of the first phase LCLK1 of the locally generated clock to pass so as to produce a modified clock signal having an average frequency of 6.9375 MHz. Such a modified clock signal will clock the bits of the teletext data into the shift register at the rate of the modified clock signal despite the fact that the second phase LCLK2 is not modified. The modified clock signal therefore enables the bits of the teletext data to be sent on for processing in their correct groups.

Difficulties that might arise as a result of the higher rates of LCLK1 and LCLK2 compared to TCLK is that an active transition of the modified clock signal causing the first stage flip-flop 10 of the shift register to respond to the teletext data bit output from the flip-flop 3, could occur at a time at which the data bit is changing and that a teletext data bit could be sampled twice. If either should happen an incorrect data bit may be stored by the flip-flop 10. It is the function of the flip-flops 4 and 7 and the gates 8 and 9 to prevent that from happening.

The circuitry of FIG. 1 executes the following algorithm:
IF (PRESENT SAMPLED TCLK IS HIGH) [CONDITION 1]
OR
IF (PREVIOUS SAMPLED TCLK IS LOW) [CONDITION 2]
THEN READ SDATA ON THE NEXT ACTIVE TRANSITION OF LCLK1

The TCLK samples are stored in inverse form in the flip-flops 4 and 7, the flip-flop 4 storing the inverse of the present TCLK sample and flip-flop 7 storing the inverse of the previous TCLK sample. The NAND gate 9 responds to the Q output of the flip-flop 4 and the $\overline{Q}$ output of the flip-flop 7 so as to produce a HIGH output if either (or both) of the Q output of flip-flop 4 and the $\overline{Q}$ output of flip-flop 7 is low. Taking into account the inversion by the inverter 2, it follows that the output of the gate 9 is HIGH if CONDITION 1 or CONDITION 2 is met. The output of the gate 9 controls the gate 8 so as to pass the pulses of LCLK1 to the shift register stages 10, 11 and the terminal 12 in accordance with the algorithm.

The general method of the algorithm is to sample TCLK one or more times during a bit of SDATA, to recognise whether each sample corresponds to a HIGH or LOW portion of TCLK and then to chose for each TCLK sample a time relative to the sampling instant at which to read SDATA, that time being during the next bit of SDATA after the instant at which the corresponding sample of TCLK was taken.

In many circumstances it will be desirable to read each bit once and only once. To achieve that, any algorithm in accordance with the above general method should also provide a method of ensuring that, where more than one choice of time is available for a particular bit of SDATA, SDATA is actually read once only. The particular algorithm that the circuit of FIG. 1 employs ensures that, by sampling TCLK and reading SDATA only at discrete times under the control of the local clock LCLK1, and by ensuring that, if more than one sample of TCLK is available during a bit of SDATA so that a plurality of choices of times to read SDATA during the next bit are available, then the choices are all for the same time, thus resulting in that bit of SDATA being read only once.

Figure 2:
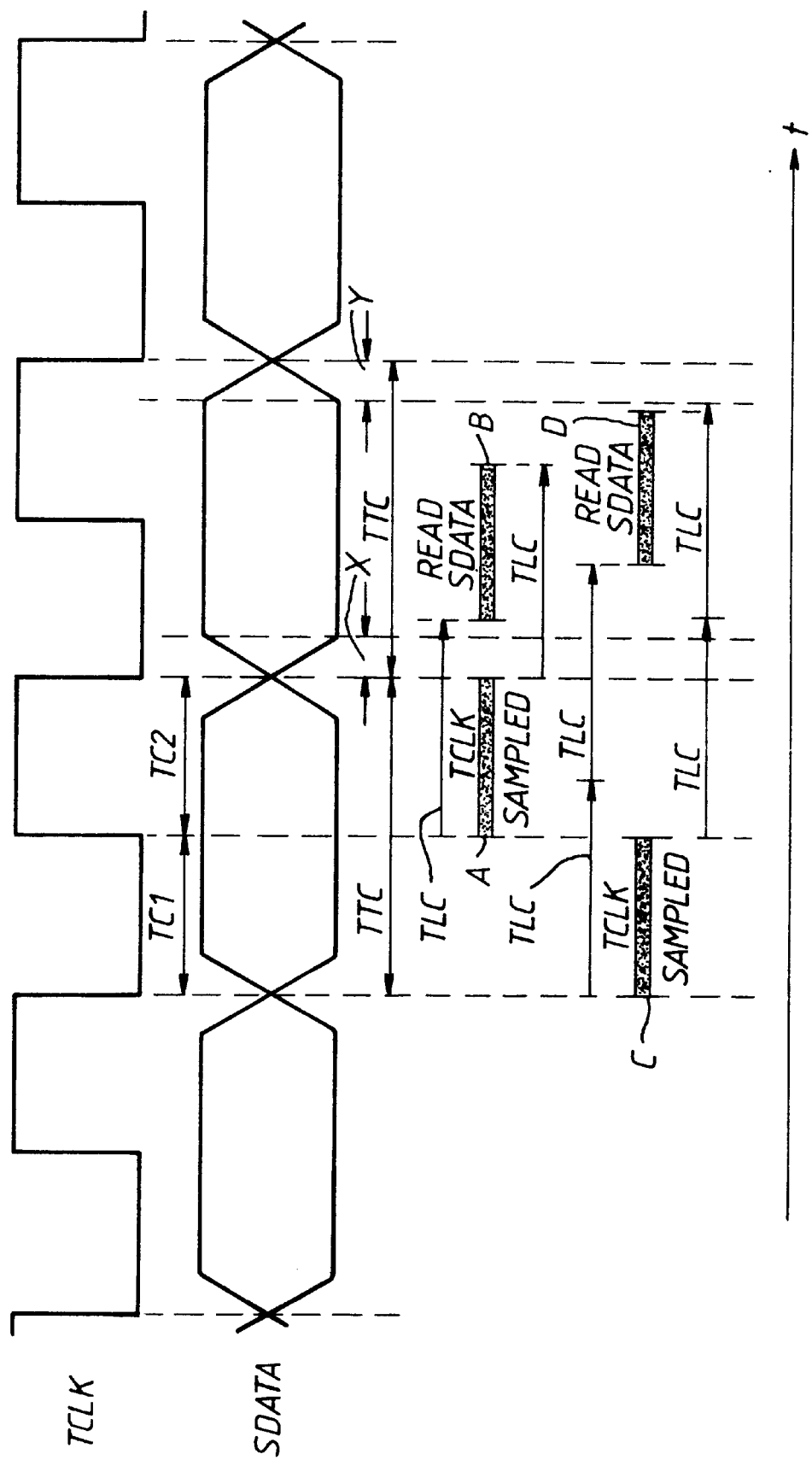
FIG. 2 illustrates the operation of the algorithm used by the circuit of FIG. 1.

FIG. 2 is a diagram illustrating the operation of the algorithm. In FIG. 2, which shows the waveforms of the teletext clock TCLK and the stabilised teletext data SDAiA plotted against time t, the symbols TTC and TLC stand for the period times of the teletext clock and the local clock respectively. TCLK has low and high portions which have durations of TC1 and TC2 respectively, so that TC1+TC2= TTC.

Bar A represents times at which TCLK is HIGH and would be sampled as HIGH. As can be seen from the statement of the algorithm such a sample results in SDATA being read one period of LCLK1 later. In the circuit of FIG. 1 SDATA, the output flip-flop 3, is read by flip-flop 10. In FIG. 2 there is shown a bar B one period of LCLK1 later than bar A which therefore represents the times at which the resulting read operation would take place.

Bar C represents times at which TCLK is LOW and would be sampled at LOW. Bar D represents the times at which the corresponding read would occur two periods of LCLK1 later.

In the circuit of FIG. 1 the gate 8 passes to the flip-flop 10 only the pulses of LCLK1 selected by the algorithm; in practice gate 8 can be open for a period corresponding to the start of the bar B until the end of bar D.

If the sampling of TCLK during one bit of SDATA is to cause SDATA to be read during its next bit using the algorithm then there must be restrictions on the ratio between the periods of TCLK and LCLK1; from FIG. 2 these can be seen to be

TLC>TC2
TLC<TTC
2×TLC>TTC
2×TLC<TC2+TTC

In FIGS. 2 X and Y represent periods at the beginning and end of a bit during which SDATA may be changing therefore making the reading of SDATA unreliable. Where these periods are significant the above restrictions, if SDATA is to be read during its stable period, need to be modified to

TLC>TC2+X
TLC<TTC−Y
2×TLC>TTC+X
2×TLC<TC2+TTC−Y.

Further modifications may be required to allow for the delays introduced by gates 2, 8 and 9 and flip-flops 3, 4 and 7 of the circuit of FIG. 1 if those delays are likely to be significant at the frequencies involved.

As noted above the algorithm ensures that where more than one choice of time is available for reading a particular bit of SDATA that bit is in fact read only once. With the above restrictions on the ratio between the periods of the clocks the maximum number of samples of TCLK during one bit is two, once during the low period of TCLK (Bar C) and once during its high period (Bar A). Since the sample of TCLK during Bar A would be TTC later than that during bar C and the respective choices of the times to read SDATA are one and two times TTC then those choices will be for exactly the same time. As a result, SDATA is read only once during that bit; in FIG. 2 the read point would be during the overlap of Bar B and Bar D.

Figure 3:
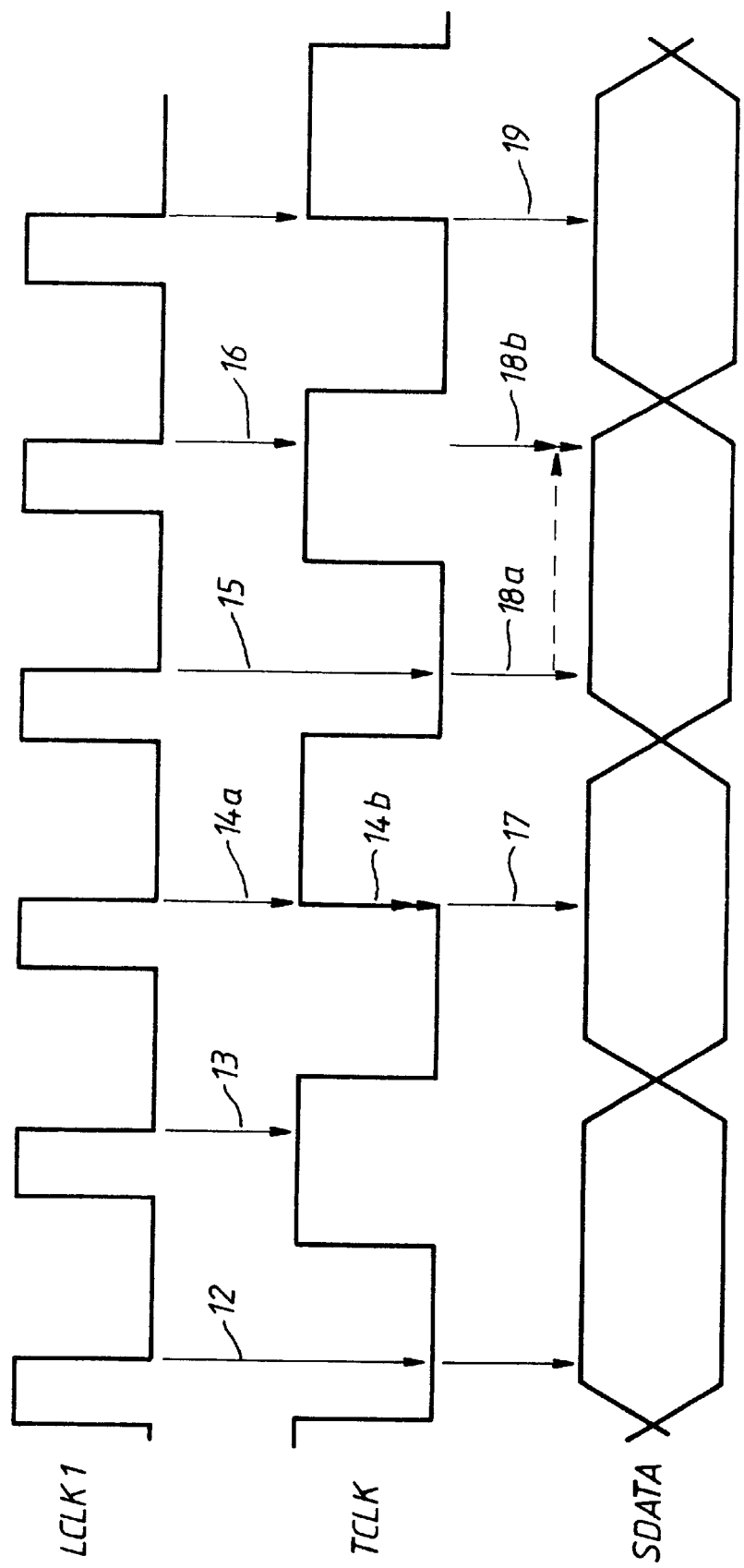
FIGS. 3 & 4 illustrate why uncertainties in the sampling of the data clock signal by the circuit of FIG. 1 do not affect correct reading of the data.
Figure 4:
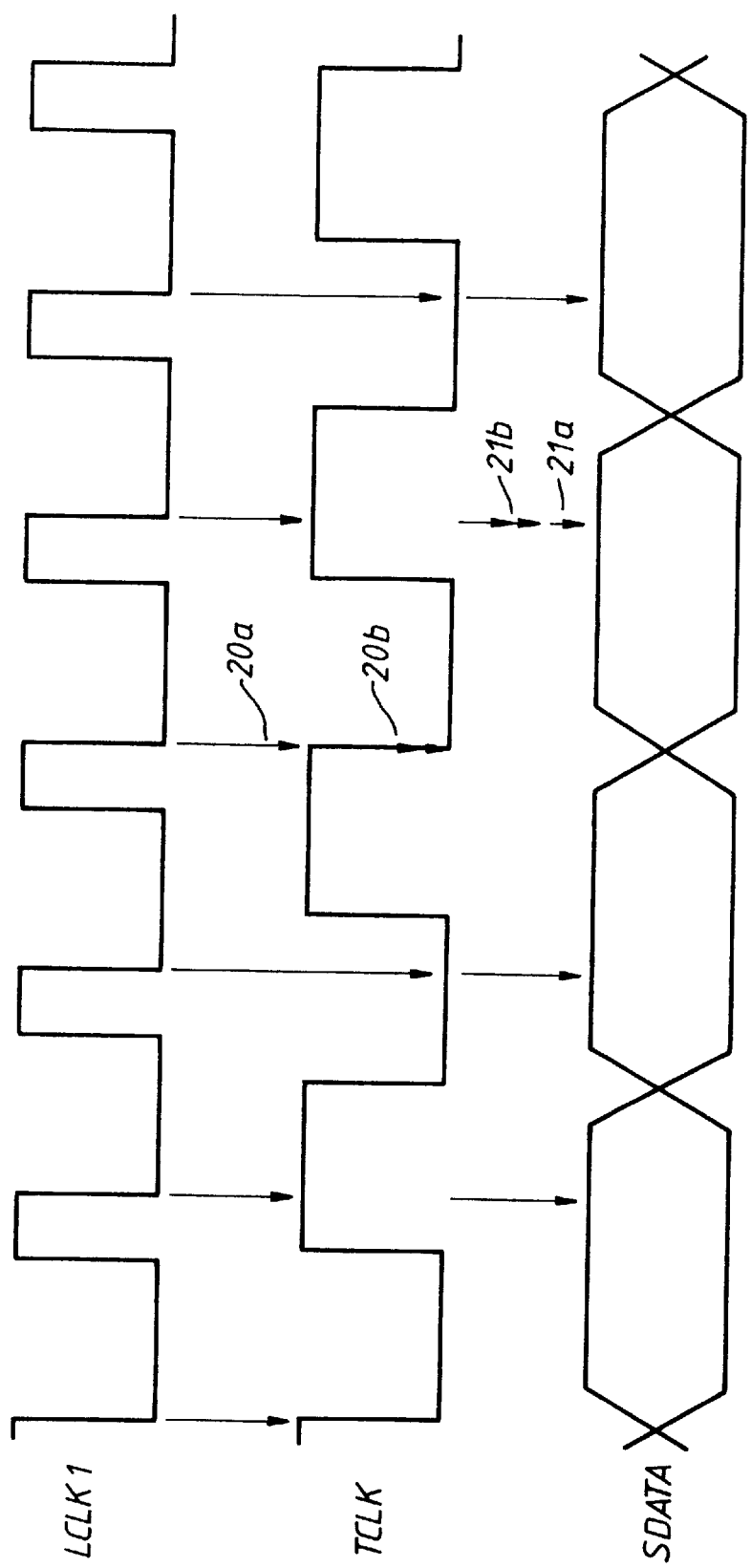

FIGS. 3 and 4 illustrate the ability of the algorithm to enable a bit of SDATA to be read correctly despite incorrect sampling of TCLK (in the circuit of FIG. 1 the inverted form of TCLK is sampled by flip-flop 4). FIGS. 3 and 4 show the waveforms of those signals, LCLK1 the local clock, TCLK the teletext clock and SDATA the stabilised teletext data. Arrows represent sample times.

The negative going edges of LCLK1 determine the times at which TCLK is sampled. Those are represented by the arrows 12, 13, 14a, 14b, 15 and 16. The arrows also indicate the value of TCLK at the times of sampling, short arrows representing HIGH and long arrows representing LOW. The times, determined by the algorithm, when SDATA is sampled are represented by the arrows 17, 18a, 18b and 19. By following the conditions of the algorithm it can be seen that samples 12 and 13 of TCLK result in sample 17 of SDATA and that samples 15 and 16 of TCLK result in sample 19 of SDATA. Regarding sample 14 of TCLK it can be seen that it is very close to a positive going edge of TCLK with the result that the sample taken may be HIGH 14a or LOW 14b. However, that uncertainty does not affect the value of SDATA sampled. Following the algorithm for the case where HIGH 14a is sampled it can be seen that SDATA is sampled at 18a, and similarly for LOW 14b SDATA is sampled at 18b, which is within the same bit of SDATA. That means that whatever value is obtained when TCLK is sampled at 14 the same value is obtained for the resulting sample of SDATA.

The case of sampling TCLK near a negative going edge is illustrated in FIG. 4. As a result the sample taken may be a HIGH 20a or LOW 20b. In either case it can be seen, by following the algorithm that the marked set of samples of TCLK result in SDATA being sampled at exactly the same times.

Figure 5:
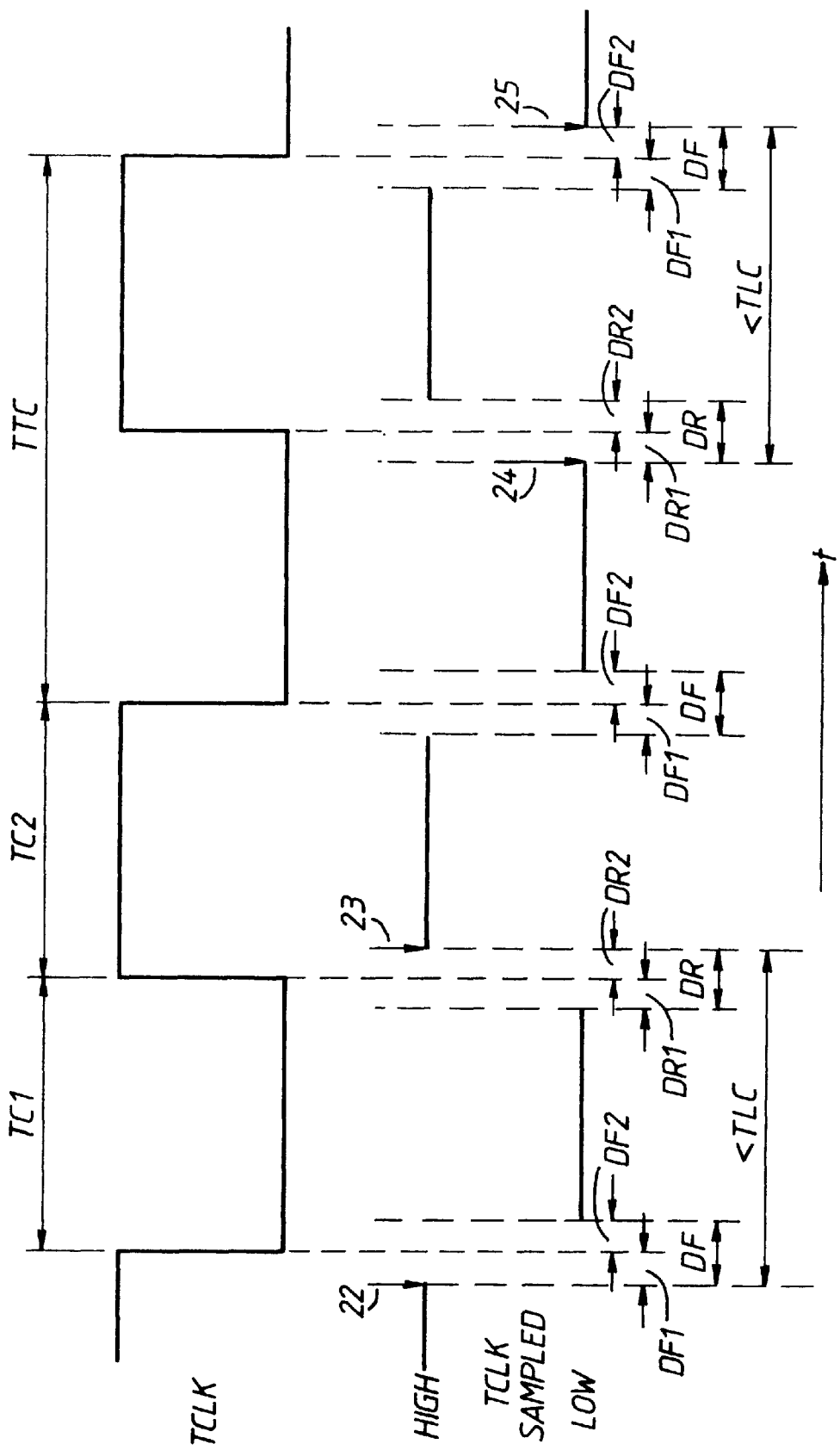
FIG. 5 is a diagram used to explain a restriction on the ratio of the frequencies of the data clock and the local clock if the circuit of FIG. 1 is to be unaffected by uncertainties in the sampling of the data clock signal.

FIG. 5 illustrates some other restrictions on the ratio between the periods of TCLK and LCLK1 which are a consequence of possible incorrect sampling of TCLK illustrated in FIGS. 3 and 4. For the algorithm employed by the circuit of FIG. 1 to enable a bit of SDATA to be read correctly despite an incorrect sampling of TCLK it is a requirement that if a sampling of TCLK could provide an uncertain value then the immediately preceding and the immediately following samples should provide definite values. In FIG. 5 the waveform TCLK is shown and also a waveform showing the values which TCLK would provide when sampled but only for those parts of TCLK for which the sample value is certain; the blank intervals on each side of the falling and rising edges of TCLK, where the sampling of TCLK would provide uncertain values, are marked DF1, DF2, DR1, DR2 respectively. Arrows 22 and 23 represent two samples of TCLK taken TLC apart; if their separation were reduced it would be possible for two consecutive uncertain samples to occur, for example sample 22 during the interval DF and sample 23 during the interval DR. The resulting restriction on the ratio between the period of TCLK and LCLK is TLC>TC1+DF1+DR2.

Arrows 24 and 25 represent two similar samples to 22 and 23 but where the first is close to a rising rather than a falling edge of TCLK. The corresponding restriction is:

TLC>TC2+DR1+DF2

The two restrictions can be combined to give:

2×TLC>TTC+DR+DF which unlike those discussed in relation to FIG. 2, is independent of the mark to space ratio of TCLK, unless of course the intervals DR and DF were to overlap.

The period of the local clock TLC can be between 0.5 and 1.0 times that of the data clock TTC if DR and DF are negligible. The mark to space ratio dependent restrictions limit this further, of course, depending on the particular mark to space ratio of the data clock TCLK. A mark to space ratio of 1:1 has in general some advantages, for example absence of a DC level if mark and space are represented by equal and opposite voltages. For a 1:1 ratio and negligible periods X and Y for changeover between bits of SDATA, TLC is limited to being between 0.5 and 0.75 times TTC.

For the particular application of the invention to interfacing a teletext signal to digital processing circuitry, the frequencies involved are 6.9375 MHz for TCLK and TDATA and either 11.0 MHz or 11.5625 MHz for LCLK1 and LCLK2 which satisfy the above limitations. The invention can, of course, be applied to other types of signals and to other clock frequencies within the limitations indicated.

The circuit described above with reference to FIG. 1 may be modified in a number of ways. For example, the flip-flops 4, 7, 10 and 11 may be of a type, such as TDN11, which in addition to being of the two phase type have a second digit input and a third clock input which can be employed to connect the flip-flops into a long shift register so that the circuit, including those parts not shown or described, can be put through a scan-testing procedure. The description of FIG. 1 above refers to the locally generated clock signal LCLK1 having an associated second clock signal LCLK2 in antiphase with it. It would of course be possible to have the flip flops 4, 7, 10, 11 as single phase ones operated by LCLK1 or the modified clock signal alone if those signals are appropriately delayed before being applied to each of those flip flops.

What is claimed is:

1. A method of reading a data signal, the data signal having an associated data clock signal with a frequency equal to the bit rate of the data signal including, providing a local clock signal having a higher frequency than the data clock signal, sampling the data clock signal at at least one sampling instant during the occurrence of each bit of the data signal, the sampling instants being referenced to the local clock signal, for each bit of the data signal determining from the value of at least one previous sample of the data clock signal the time, referenced to the local clock signal, of at least one reading instant, and reading each bit of the data signal at a corresponding reading instant.

2. A method according to claim 1 wherein each sample of the data clock signal determines a reading instant.

3. A method according to claim 2 wherein the same reading instant is determined from two previous samples of the data clock signal.

4. A method according to claim 1 wherein the determination of the time of a reading instant includes determining the interval between a sampling instant and its corresponding reading instant.

5. A method according to claim 4 wherein the interval between a sampling instant and its corresponding reading instant is a whole number of periods of the local clock signal.

6. A method according to claim 4 wherein the samples of the data clock signal are stored in digital form dependent on the signal level at the respective sampling instant.

7. A method according to claim 6 wherein the length of the time interval between a sampling instant and a reading instant is determined by the digital value of the data clock signal at the sampling instant.

8. A method according to claim 7 wherein the time interval is two periods of the local clock signal if the data clock signal has a first digital value when sampled, and is one period of the local clock signal if the data clock signal has a second digital value when sampled.

9. A method according to claim 7 wherein the data clock signal has mark to space ratio substantially equal to 1:1.

10. A method according to claim 1 wherein each bit of the data signal is read exactly once.

11. A method according to claim 1 wherein bits of the data signal are read only during periods when the signal level is steady.

12. Apparatus for reading a data signal having an associated data clock signal with a frequency equal to the bit rate of the data signal, the apparatus including a first input terminal connected to receive the data signal, a second input terminal connected to receive the data clock signal, a local clock generating a local clock signal of higher frequency than the data clock signal, sampling means for sampling the data clock signals applied to the second input terminal at instants determined by the active edges of the local clock signal, storage means for storing samples taken by the sampling means, decision means responsive to the samples stored in the storage means, gating means responsive to the decision means and to the local clock signal to produce a modified data clock signal having active edges corresponding to those of the local clock signal at an average frequency equal to that of the data clock signal, and means for reading the data signal in response to the active edges of the modified data clock signal.

13. An apparatus according to claim 12 wherein the storage means is arranged to store one of two digital values for each sample taken by the sampling means depending on whether the level of the data clock signal at the instant of sampling is above or below a threshold level.

14. An apparatus according to claim 13 wherein the decision means causes the gating means to select an active edge from the local clock signal if the latest sample has a first digital value or if the sample immediately preceding the latest sample has a second digital value.

15. A method of reading a data signal, the data signal having an associated data clock signal with a frequency equal to the bit rate of the data signal including, providing a local clock signal having a higher frequency than the data clock signal, sampling the data clock signal at at least one sampling instant during the occurrence of each bit of the data signal, the sampling instants being referenced to the local clock signal, for each bit of the data signal determining from the value of at least one previous sample of the data clock signal the time, referenced to the local clock signal, of at least one reading instant, and reading each bit of the data signal at a corresponding reading instant, wherein the data signal has a bit rate of 6.9375 MHz and the local clock signal has a frequency of 11.0 MHz or 11.5625 MHz.

16. Apparatus for reading a data signal having an associated data clock signal with a frequency equal to the bit rate of the data signal, the apparatus including a first input terminal connected to receive the data signal, a second input terminal connected to receive the data clock signal, a local clock generating a local clock signal of higher frequency than the data clock signal, sampling means for sampling the data clock signals applied to the second input terminal at instants determined by the active edges of the local clock signal, storage means for storing samples taken by the sampling means, decision means responsive to the samples stored in the storage means, gating means responsive to the decision means and to the local clock signal to produce a modified data clock signal having active edges corresponding to those of the local clock signal at an average frequency equal to that of the data clock signal, and means in the form of a latch for reading the data signal in response to the active edges of the modified data clock signal.

* * * * *